(12) United States Patent
Uesugi et al.

(10) Patent No.: US 10,465,789 B2
(45) Date of Patent: Nov. 5, 2019

(54) CASE OF STRUCTURE

(71) Applicant: MAZDA MOTOR CORPORATION, Hiroshima (JP)

(72) Inventors: Tatsuya Uesugi, Onomichi (JP); Tadatoshi Watanabe, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/760,544

(22) PCT Filed: Nov. 21, 2016

(86) PCT No.: PCT/JP2016/084501
§ 371 (c)(1),
(2) Date: Mar. 15, 2018

(87) PCT Pub. No.: WO2017/090564
PCT Pub. Date: Jun. 1, 2017

(65) Prior Publication Data
US 2018/0259056 A1  Sep. 13, 2018

(30) Foreign Application Priority Data

Nov. 24, 2015  (JP) ................................. 2015-228607

(51) Int. Cl.
*F16H 57/03* (2012.01)
*F16H 57/04* (2010.01)
(Continued)

(52) U.S. Cl.
CPC ........... *F16H 57/03* (2013.01); *F16H 57/031* (2013.01); *F16H 57/04* (2013.01); *F16H 57/0435* (2013.01); *B60K 17/34* (2013.01)

(58) Field of Classification Search
CPC ............. F16H 57/0424; F16H 57/0435; F16H 57/0446; F16H 57/0426; F16H 57/0427;
(Continued)

(56) References Cited

U.S. PATENT DOCUMENTS 3,263,521 A * 8/1966 Josef Muller .......... B23Q 1/015
74/606 R
3,587,732 A * 6/1971 Burne ................... F28D 7/1669
165/158
(Continued)

FOREIGN PATENT DOCUMENTS

EP     0990820 A2 *  4/2000  ......... F16H 57/0412
JP     05-075553 U  * 10/1993
(Continued)

OTHER PUBLICATIONS

EPO Translation of the Description of EP 0990820 A2, Neudorfer et al., Apr. 5, 2000 (Year: 2019).*
(Continued)

*Primary Examiner* — Daniel D Yabut
(74) *Attorney, Agent, or Firm* — Studebaker & Brackett PC

(57) ABSTRACT

The present application discloses a case of a vehicle structure in which a mechanical element is stored. The case includes a wall surface portion which forms an outer surface of the case, and a skeleton portion which bulges inward and outward of the case from the wall surface portion, the skeleton portion being integrally formed with the wall surface portion. The skeleton portion includes at least one skeleton member having: a first porous portion in which first holes are formed to extend in a first direction; and a first skin layer without the first holes, the first skin layer surrounding the first porous portion. A cross-sectional area of the first holes increases in a cross-section intersecting the first direc-
(Continued)

tion from an outer circumferential surface toward the center of the at least one skeleton member.

3 Claims, 11 Drawing Sheets

(51) Int. Cl.
    *F16H 57/031*     (2012.01)
    *B60K 17/34*     (2006.01)

(58) Field of Classification Search
    CPC ............. F16H 57/0428; F16H 57/0431; F16H 57/0432; F16H 57/0456; F16H 57/0421; F16H 57/042; F16H 57/0423; F16H 57/031; F16H 57/03; F16H 57/04; F16H 2057/02017; F28F 13/003; F28D 17/02
    See application file for complete search history.

(56) References Cited

U.S. PATENT DOCUMENTS

| | | | |
|---|---|---|---|
| 5,072,784 A * | 12/1991 | Stenlund | F16H 57/0415 165/164 |
| 5,644,954 A * | 7/1997 | Matsufuji | F16H 37/043 74/606 R |
| 7,128,532 B2 * | 10/2006 | Petervary | B64C 1/38 416/97 A |
| 2007/0275210 A1 * | 11/2007 | Heselhaus | F01D 5/288 428/116 |
| 2010/0011896 A1 * | 1/2010 | Iwasaki | F16H 57/0494 57/494 |
| 2016/0069622 A1 * | 3/2016 | Alexiou | G06F 1/1656 165/146 |

FOREIGN PATENT DOCUMENTS

| | | |
|---|---|---|
| JP | 2013-117240 A | 6/2013 |
| JP | 2015-042475 A | 3/2015 |
| WO | 2015/146914 A1 | 10/2015 |

OTHER PUBLICATIONS

International Search Report issued in PCT/JP2016/084501; dated Feb. 14, 2017.

\* cited by examiner

S5>S4>S3>S2>S1

T7＞T6＞T5＞T4＞T3＞T2＞T1

U4>U3>U2>U1

V6＞V5＞V4＞V3＞V2＞V1

CASE OF STRUCTURE

TECHNICAL FIELD

The present invention relates to a case for a structure.

BACKGROUND ART

High rigidity and lightweight are required for a case of a structure such as a transmission which is mounted on a vehicle. Therefore, the case is often formed by using a metal material such as aluminum entirely. A rib may be formed on the metal case for a structure. In this case, a designer may use alloy having small specific gravity as the metal material of the case to provide the case with high rigidity. In addition, the designer may also set a thickness of the case to a small value. However, the designer may face limitation of weight reduction even when the rib is used since the metal material is used for the whole case.

Resin may be used for a part of a case of a structure. The case having a structure in which a metal frame member and a resin cover member are combined is well-known. Patent Document 1 discloses a side cover which forms a part of a case of a transmission. The side cover disclosed in Patent Document 1 includes metal frame members and a resin cover member. The cover member covers an opening portion formed between the frame members.

As taught in Patent Document 1, the combination of the metal frame members with the resin cover member contributes to high rigidity and weight reduction of the case of a structure. However, further weight reduction is required for the case of a structure in order to improve fuel economy of a vehicle.

PATENT DOCUMENT

Patent Document 1: JP 2013-117240 A

SUMMARY OF INVENTION

An object of the present invention is to provide a rigid and lightweight case of a structure.

A case according to one aspect of the present invention is used as a case of a vehicle structure, in which a mechanical element is stored. The case includes: a wall surface portion which forms an outer surface of the case; and a skeleton portion which bulges inward and outward of the case from the wall surface portion, the skeleton portion being integrally formed with the wall surface portion. The skeleton portion includes at least one skeleton member having a first porous portion in which first holes are formed to extend in a first direction, and a first skin layer without the first holes, the first skin layer surrounding the first porous portion. A cross-sectional area of each of the first holes is set in a cross-section intersecting the first direction to become larger from an outer circumferential surface of the at least one skeleton member toward a center of the at least one skeleton member.

The aforementioned case may become lightweight and rigid.

These and other objects, features and advantages of the present invention will become more apparent upon reading the following detailed description along with the accompanying drawings.

DESCRIPTION OF EMBODIMENTS

First Embodiment

Figure 1:
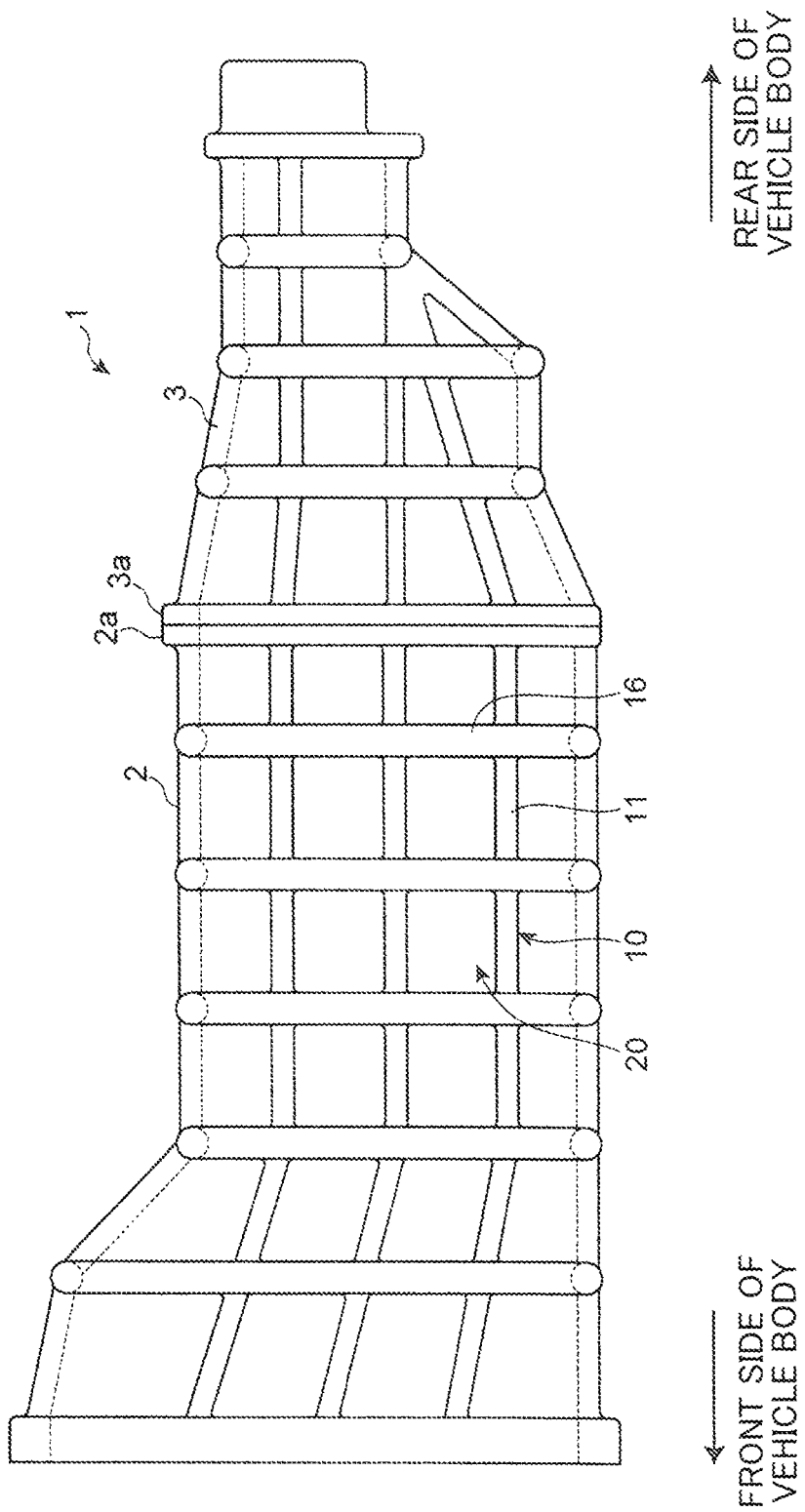
FIG. 1 is a side view of a case of a structure according to the first embodiment.
Figure 2:
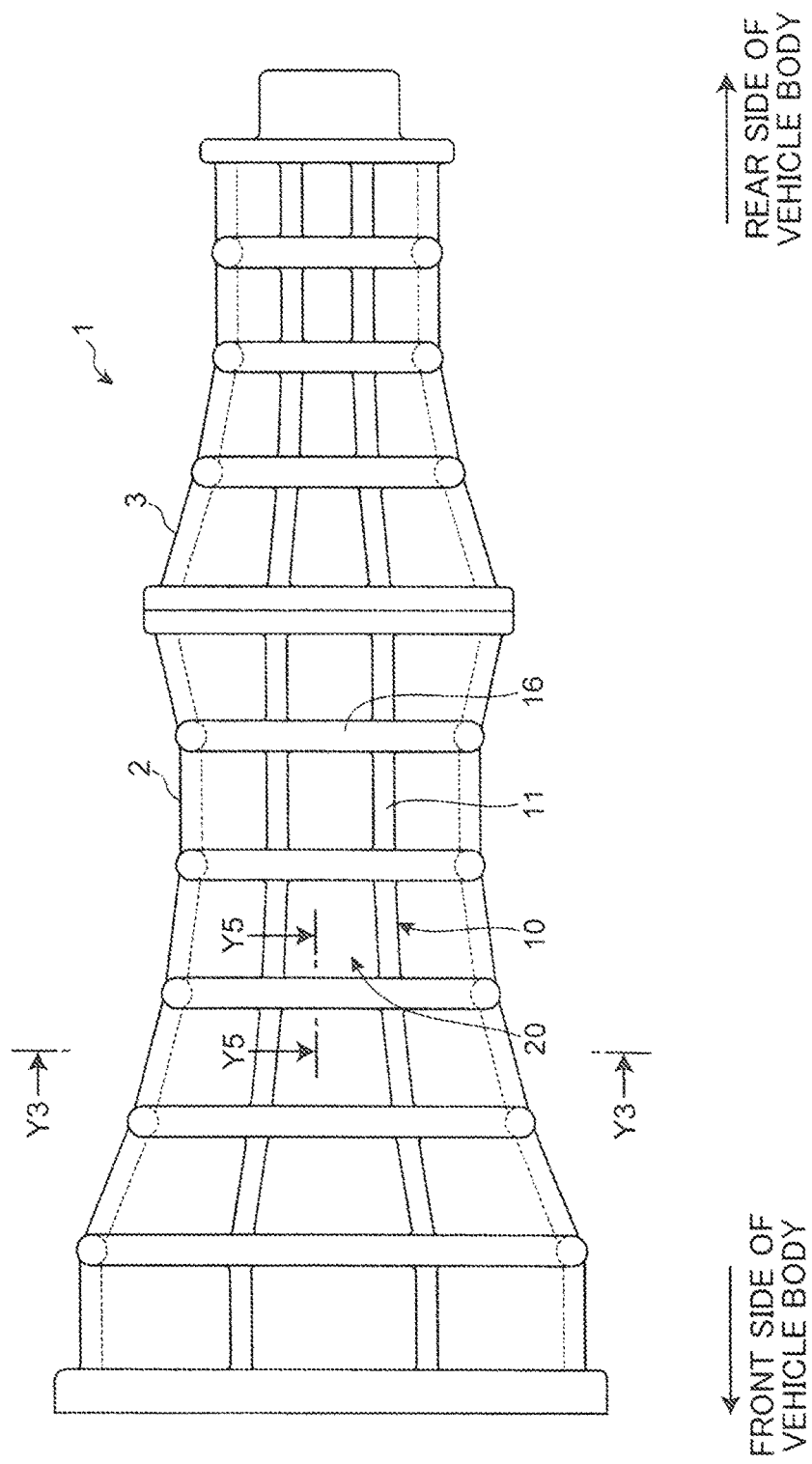
FIG. 2 is a top plan view of the case of the structure shown in FIG. 1.
Figure 3:
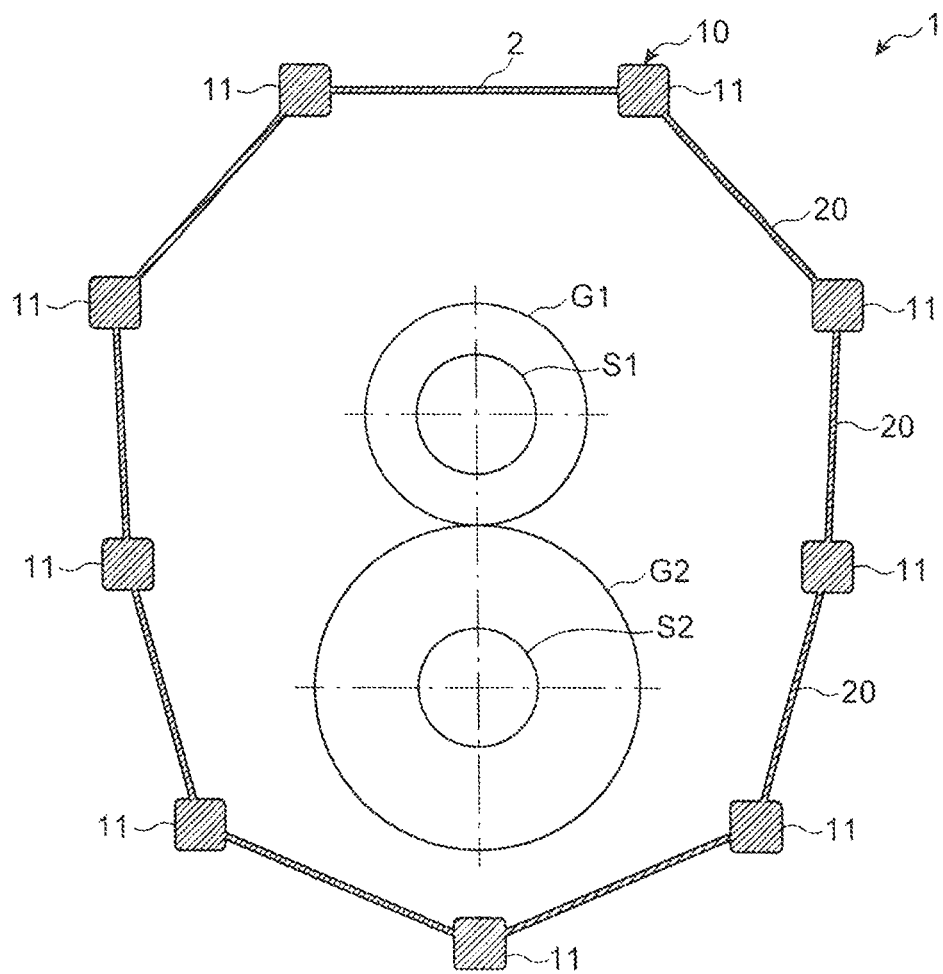
FIG. 3 is a cross-sectional view of the case of the structure taken along the line Y3-Y3 in FIG. 2.

FIG. 1 is a side view of a case of a structure according to the first embodiment. FIG. 2 is a top plan view of the case of the structure. FIG. 3 is a cross-sectional view of the case of the structure taken along the line Y3-Y3 in FIG. 2. The case according to the first embodiment is described with reference to FIGS. 1 to 3. The directional terms such as "front", "rear", "left", "right", "up" and "down" are used on the basis of a vehicle body.

As shown in FIGS. 1 and 2, the case 1 of the structure according to the first embodiment is used as a case for a transmission which forms a power transmission device mounted on a vehicle. The vehicle is a front-engine rear-drive vehicle. The transmission is a longitudinally mounted manual transmission. An input shaft S1 (c.f. FIG. 3) of the transmission is substantially coaxial with an output shaft (not shown) of the transmission. With regard to the present embodiment, the vehicle structure is exemplified by the manual transmission.

A transmission mechanism (not shown) is situated in the case 1. The transmission mechanism has an axis extending in the front-rear direction of the vehicle body. In addition to the input shaft S1, the transmission mechanism includes an output shaft and a counter shaft S2 (c.f. FIG. 3). The input shaft S1 is connected to a drive source (e.g. an engine) via a clutch, the drive source being situated in front of the case 1. The output shaft is coaxial with the input shaft S1. The counter shaft S2 is in parallel to the input shaft S1 and the output shaft. The input shaft S1, the output shaft and the counter shaft S2 are rotatably supported on the case 1. With regard to the present embodiment, the mechanical element is exemplified by the transmission mechanism.

The case 1 includes a body portion 2 and an extension housing 3. The body portion 2 includes a clutch housing and a transmission case integrally formed with the clutch housing. The clutch is stored in the clutch housing. The transmission mechanism is stored in the transmission case.

The extension housing 3 is situated behind the body portion 2. The extension housing 3 is connected to the body portion 2. The body portion 2 includes a flange portion 2a which forms a rear end of the body portion 2. The extension housing 3 includes a flange portion 3a which forms a front end of the extension housing 3. The flange portions 2a, 3a are fixed by bolts and nuts.

The case 1 includes a skeleton portion 10 and wall surface portions 20. The skeleton portion 10 forms a skeleton of the case 1. The wall surface portions 20 form a part of the case 1 except for the skeleton portion 10 (i.e. a non-skeleton portion). As shown in FIG. 3, the skeleton portion 10 bulges inward and outward of the case 1 from the wall surface portions 20.

The skeleton portion 10 includes first skeleton portions 11 and second skeleton portions 16. The first skeleton portions 11 extend in the front-rear direction of the vehicle body (i.e. in the axis direction of the case 1). The second skeleton portions 16 extend in a circumferential direction of the case 1 in a cross-section orthogonal to the axis direction of the case 1. As shown in FIGS. 1 and 2, the first skeleton portions 11 and the second skeleton portions 16 form an orthogonal grid. The wall surface portions 20 cover rectangular spaces surrounded by the first skeleton portions 11 and the second skeleton portions 16 to form a major part of an outer surface of the case 1. The first skeleton portions 11, the second skeleton portions 16 and the wall surface portions 20 are integrally formed. With regard to the present embodiment, the skeleton member is exemplified by the first or second skeleton portion 11, 16. The first direction is exemplified by the axis or circumferential direction of the case 1.

FIG. 3 shows a cross-section orthogonal to the axis direction of the case 1. As shown in FIG. 3, the first skeleton portions 11 are arranged at intervals in the circumferential direction of the case 1. FIG. 3 shows the input shaft S1 and the counter shaft S2, in addition to the first skeleton portions 11. The input shaft S1 and the counter shaft S2 are situated in the case 1. FIG. 3 further shows gears G1, G2. The gear G1 is mounted on the input shaft S1. The gear G2 is mounted on the counter shaft S2. The gear G2 is engaged with the gear G1.

Figure 4:
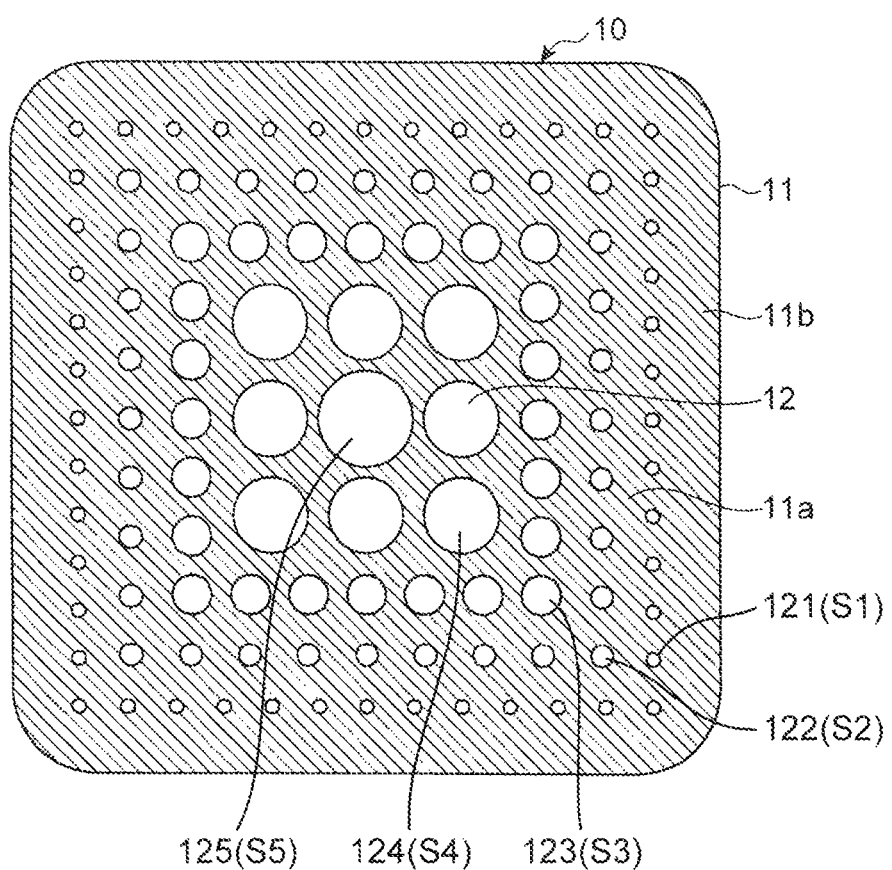
FIG. 4 is a cross-sectional view of a first skeleton portion of the case of the structure shown in FIG. 1.

FIG. 4 is an enlarged cross-sectional view showing one of the first skeleton portions 11. The first skeleton portion 11 is described with reference to FIGS. 1 to 4.

As shown in FIGS. 1 and 2, the first skeleton portion 11 extends in the axis direction of the case 1. As shown in FIGS. 3 and 4, the first skeleton portion 11 has a substantially rectangular cross-section orthogonal to the axis direction of the case 1. As shown in FIG. 4, the first skeleton portion 11 has a porous structure. Holes 12 formed in the cross-section of the first skeleton portion 11 to extend in the axis direction of the first skeleton portion 11. With regard to the present embodiment, the first holes may be exemplified by the holes 12.

The first skeleton portion 11 includes a porous portion 11a, and a skin layer 11b surrounding the porous portion 11a. The holes 12 are formed in the porous portion 11a whereas the holes 12 are not formed in the skin layer 11b. The skin layer 11b has a predetermined thickness. Therefore, the holes 12 are formed at a position away from an outer circumferential surface of the first skeleton portion 11 by a distance no less than a predetermined thickness (i.e. a thickness of the skin layer 11b). Each of the holes 12 has a substantially circular cross-section. The hole 12 formed at or near the center of the cross-section of the first skeleton portion 11 is larger in cross-sectional area than the hole 12 formed near the skin layer 11b. In short, the cross-sectional area of the holes 12 is set to become larger from an outer circumferential side of the first skeleton portion 11 toward an inner circumferential side of the first skeleton portion 11. With regard to the present embodiment, the first porous portion may be exemplified by the porous portion 11a. The first skin layer may be exemplified by the skin layer 11b.

FIG. 4 shows forty-eight holes 121, thirty-two holes 122, twenty-four holes 123, eight holes 124 and one hole 125 as the holes 12. The hole 125 has a center substantially coincident to the center of the cross-section of the first skeleton portion 11. The hole 125 is the largest among the holes 12. The forty-eight holes 121 are formed at substantially regular intervals along a square contour hypothetically depicted in the cross-section of the first skeleton portion 11. The center of the square hypothetically depicted by the forty-eight holes 121 is substantially coincident to the center of the hole 125. Each of the forty-eight holes 121 is the smallest in cross-sectional area among the holes 12. The thirty-two holes 122 are formed at substantially regular intervals along a square contour hypothetically depicted in the cross-section of the first skeleton portion 11. The square hypothetically depicted by the thirty-two holes 122 is smaller than the square hypothetically depicted by the forty-eight holes 121. The center of the square hypothetically depicted by the thirty-two holes 122 is substantially coincident to the center of the hole 125. Each of the thirty-two holes 122 is larger in cross-sectional area than each of the forty-eight holes 121 and smaller in cross-sectional area than the hole 125. The twenty-four holes 123 are formed at substantially regular intervals along a square contour hypothetically depicted in the cross-section of the first skeleton portion 11. The square hypothetically depicted by the twenty-four holes 123 is smaller than the square hypothetically depicted by the thirty-two holes 122. The center of the square hypothetically depicted by the twenty-four holes 123 is substantially coincident to the center of the hole 125. Each of the twenty-four holes 123 is larger in cross-sectional area than each of the thirty-two holes 122 and smaller in cross-sectional area than the hole 125. The eight holes 124 are formed at substantially regular intervals along a square contour hypothetically depicted in the cross-section of the first skeleton portion 11. The square hypothetically depicted by the eight holes 124 is smaller than the square hypothetically depicted by the twenty-four holes 123. The center of the square hypothetically depicted by the eight holes 124 is substantially coincident to the center of the hole 125. Each of the eight holes 124 is larger in cross-sectional area than each of the twenty-four holes 123 and smaller in cross-sectional area than the hole 125.

The symbol "S1" shown in FIG. 4 means a cross-sectional area of each of the forty-eight holes 121. The symbol "S2" shown in FIG. 4 means a cross-sectional area of each of the thirty-two holes 122. The symbol "S3" shown in FIG. 4 means a cross-sectional area of each of the twenty-four holes 123. The symbol "S4" shown in FIG. 4 means a cross-sectional area of each of the eight holes 124. The symbol "S5" shown in FIG. 4 means a cross-sectional area of the hole 125. The relationship represented by the inequality shown in FIG. 4 is established among these cross-sectional areas.

Figure 5:
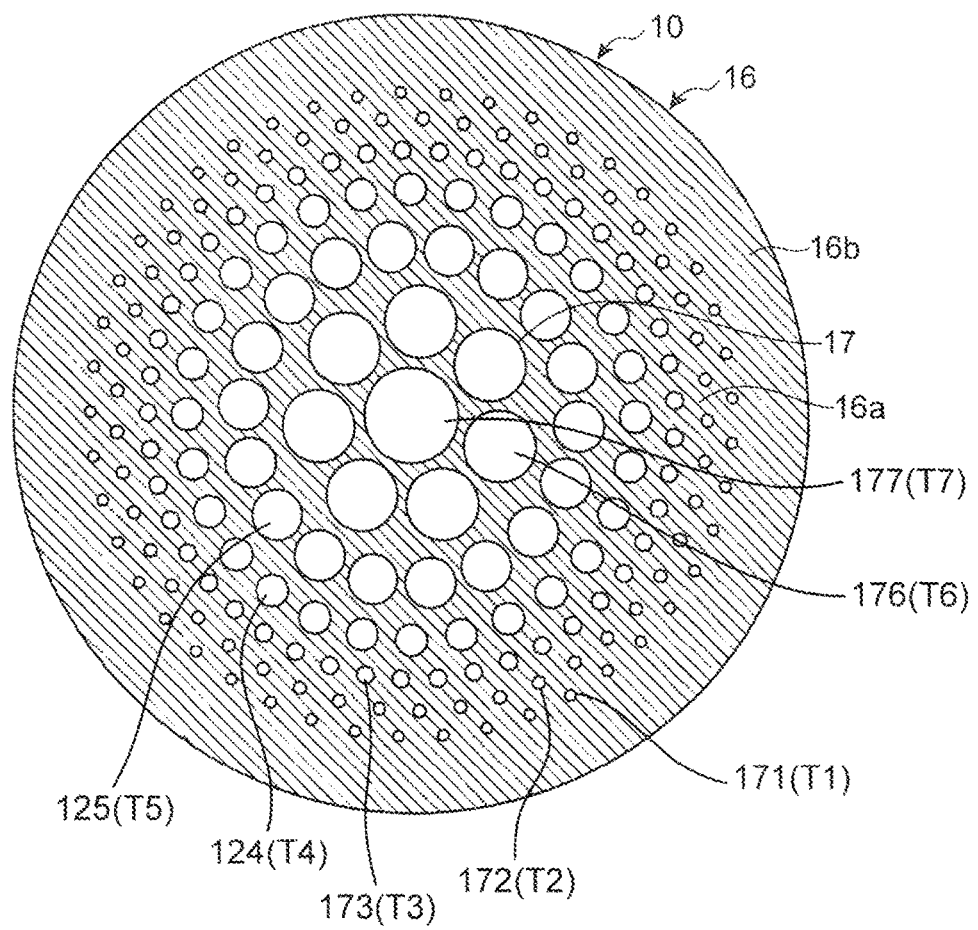
FIG. 5 is a cross-sectional view of a second skeleton portion of the case of the structure shown in FIG. 1.

FIG. 5 illustrates a cross-section of one of the second skeleton portions 16 taken along the line Y5-Y5 in FIG. 2. The second skeleton portion 16 is described with reference to FIGS. 1 to 3 and FIG. 5.

As shown in FIGS. 1 and 2, the second skeleton portions 16 are arranged at intervals in the axis direction of the case 1. Each of the second skeleton portions 16 extends in the circumferential direction of the case 1. As shown in FIG. 5, each of the second skeleton portions 16 has a substantially circular cross-section orthogonal to the circumferential direction of the case 1. Like the first skeleton portion 11, the second skeleton portion 16 has a porous structure. In short, holes 17 are formed in the second skeleton portion 16. Each of the holes 17 extends in the axis direction of the second skeleton portion 16 (i.e. in the extending direction of the second skeleton portion 16).

Each of the second skeleton portions 16 includes a porous portion 16a and a skin layer 16b. The skin layer 16b surrounds the porous portion 16a. The holes 17 are formed in the porous portion 16a whereas the holes 17 are not formed in the skin layer 16b. The skin layer 16b has a predetermined thickness. Therefore, the holes 17 are formed at a position away from an outer circumferential surface of the second skeleton portion 16 by a distance no less than the thickness of the skin layer 16b. Each of the holes 17 has a substantially circular cross-section. The hole 17 formed at or near the center of the cross-section of the second skeleton portion 16 is larger in cross-sectional area than the hole 17 formed near the skin layer 16b. In short, the cross-sectional area of the holes 17 is set to become larger from an outer circumferential side of the second skeleton portion 16 toward an inner circumferential side of the second skeleton portion 16. With regard to the present embodiment, the first porous portion may be exemplified by the porous portion 16a. The first skin layer may be exemplified by the skin layer 16b.

FIG. 5 shows forty-five holes 171, forty-five holes 172, forty-five holes 173, twenty-eight holes 174, eighteen holes 175, seven holes 176 and one hole 177 as the holes 17. The hole 177 has a center substantially coincident to the center of the cross-section of the second skeleton portion 16. The hole 177 is the largest among the holes 17. The forty-five holes 171 are formed at substantially regular intervals along a circular contour hypothetically depicted in the cross-section of the second skeleton portion 16. The center of a circle hypothetically depicted by the forty-five holes 171 is substantially coincident to the center of the hole 177. Each of the forty-five holes 171 is the smallest in cross-sectional area among the holes 17. The forty-five holes 172 are formed at substantially regular intervals along a circular contour hypothetically depicted in the cross-section of the second skeleton portion 16. The circle hypothetically depicted by the forty-five holes 172 is smaller than the circle hypothetically depicted by the forty-five holes 171. The center of a circle hypothetically depicted by the forty-five holes 172 is substantially coincident to the center of the hole 177. Each of the forty-five holes 172 is larger in cross-sectional area than each of the forty-five holes 171 and smaller in cross-sectional area than the hole 177. The forty-five holes 173 are formed at substantially regular intervals along a circular contour hypothetically depicted in the cross-section of the second skeleton portion 16. The circle hypothetically depicted by the forty-five holes 173 is smaller than the circle hypothetically depicted by the forty-five holes 172. The center of a circle hypothetically depicted by the forty-five holes 173 is substantially coincident to the center of the hole 177. Each of the forty-five holes 173 is larger in cross-sectional area than each of the forty-five holes 172 and smaller in cross-sectional area than the hole 177. The twenty-eight holes 174 are formed at substantially regular intervals along a circular contour hypothetically depicted in the cross-section of the second skeleton portion 16. The circle hypothetically depicted by the twenty-eight holes 174 is smaller than the circle hypothetically depicted by the forty-five holes 173. The center of the circle hypothetically depicted by the twenty-eight holes 174 is substantially coincident to the center of the hole 177. Each of the twenty-eight holes 174 is larger in cross-sectional area than each of the forty-five holes 173 and smaller in cross-sectional area than the hole 177. The eighteen holes 175 are formed at substantially regular intervals along a circular contour hypothetically depicted in the cross-section of the second skeleton portion 16. The circle hypothetically depicted by the eighteen holes 175 is smaller than the circle hypothetically depicted by the twenty-eight holes 174. The center of a circle hypothetically depicted by the eighteen holes 175 is substantially coincident to the center of the hole 177. Each of the eighteen holes 175 is larger in cross-sectional area than each of the twenty-eight holes 174 and smaller in cross-sectional area than the hole 177. The seven holes 176 are formed at substantially regular intervals along a circular contour hypothetically depicted in the cross-section of the second skeleton portion 16. The circle hypothetically depicted by the seven holes 176 is smaller than the circle hypothetically depicted by the eighteen holes 175. The center of a circle hypothetically depicted by the seven holes 176 is substantially coincident to the center of the hole 177. Each of the seven holes 176 is larger in cross-sectional area than each of the eighteen holes 175 and smaller in cross-sectional area than the hole 177.

The symbol "T1" shown in FIG. 5 means a cross-sectional area of each of the forty-five holes 171. The symbol "T2" shown in FIG. 5 means a cross-sectional area of each of the forty-five holes 172. The symbol "T3" shown in FIG. 5 means a cross-sectional area of each of the forty-five holes 173. The symbol "T4" shown in FIG. 5 means a cross-sectional area of each of the twenty-eight holes 174. The symbol "T5" shown in FIG. 5 means a cross-sectional area of each of the eighteen holes 175. The symbol "T6" shown in FIG. 5 means a cross-sectional area of each of the seven holes 176. The symbol "S7" shown in FIG. 4 means a cross-sectional area of the hole 177. The relationship represented by the inequality shown in FIG. 5 is established among these cross-sectional areas.

The wall surface portions 20 cover opening portions surrounded by the first and second skeleton portions 11, 16. As shown in FIG. 3, each of the wall surface portions 20 is thinner than the skeleton portion 10 (i.e. the first and/or second skeleton portions 11, 16). Each of the wall surface portions 20 generally has a flat plate shape.

The case 1 is formed by using a 3D printer (so-called three-dimensional laminate molding method). By using the 3D printer, the holes 12, 17 are easily formed in the skeleton portion 10. In addition, the 3D printer makes it easy to integrally form the wall surface portions 20 on the skeleton portion 10.

The principles of the present embodiment are not limited to specific printing techniques by a three-dimensional laminate molding method. When metal such as aluminum is used as a material of the case 1, an operator may spread powder of the metal to form a layer of the metal powder. The operator may radiate an electron beam or a laser beam at an intended position on the layer of the metal powder. As a result of the radiation of the electron beam or the laser beam, the metal powder on the radiated area is sintered. The sintered metal powder forms a part of the case 1. Thereafter, the operator forms another layer of the metal powder on the case 1, and radiates an electron beam or a laser beam so that a shape of the layer matches with the shape of the case 1. As a result of repeatedly forming a layer of the metal powder and radiating the electron beam or the laser beam (i.e. as a result of sintering molding method), the case 1 is formed easily and accurately. Optionally, the operator may apply finishing processes to the case formed by the 3D printer.

When the skeleton portion 10 is formed by a three-dimensional laminate molding method, the metal powder stays in the holes 12, 17 formed in the skeleton portion 10. Therefore, communication holes may be formed to extend from the holes 12, 17 to an inner surface or an outer surface of the case 1. The metal powder remaining in the holes 12, 17 is removed from the holes 12, 17 through the communication holes.

With regard to the present embodiment, the skeleton portion 10 is integrally formed with the wall surface portion 20 by a three-dimensional laminate molding method. Alternatively, an operator may form the wall surface portion 20 by die cast molding while forming the skeleton portion 10 with use of a three-dimensional laminate molding method. For example, an operator may integrally form the first skeleton portions 11 and the second skeleton portions 16 to form the skeleton portion 10. The formed skeleton portion 10 is placed in a molding die. Thereafter, a molten metal material (e.g. aluminum) is fed into the molding die (die cast molding) to form the wall surface portion 20 integral with the skeleton portion 10.

Further alternatively, injection molding using a resin material may be used in molding the wall surface portion 20, in place of die cast molding. For example, an operator may integrally form the first skeleton portions 11 and the second skeleton portions 16 to form the skeleton portion 10. The formed skeleton portion 10 is placed in a molding die. Thereafter, molten thermoplastic resin is injected into the molding die to the wall surface portion 20 integral with the skeleton portion 10.

With regard to the present embodiment, the skeleton portion 10 includes the first skeleton portions 11 extending in the axis direction of the case 1 and the second skeleton portions 16 extending in the circumferential direction of the case 1. A designer may design a skeleton portion having an optimum shape by using topology optimization techniques. For example, a designer may provide a case with the most lightweight shape having an intended rigidity by using the topology optimization techniques.

The designer using the topology optimization techniques may create an analysis model of a case. An inner space of the analysis model is filled except for a part where components such as a clutch and a transmission mechanism are situated. The designer may apply predetermined constraint conditions about bending rigidity and torsional rigidity to the analysis model to determine a portion, which contributes to improvement of rigidity, and a portion which does not contribute to improvement of rigidity. The designer may form a space in the portion, which does not contribute to improvement of rigidity, and may allow the portion, which contributes to improvement of rigidity, to remain in the analysis model. The designer may set a shape of a portion, which finally remains in the analysis model, as a shape of the case.

With regard to the present embodiment, the holes 12, 17 are formed in the skeleton portion 10 to extend in the axis direction of the skeleton portion 10. Since a conventional skeleton portion is completely solid, the conventional skeleton portion is very heavy. The skeleton portion 10 according to the present embodiment, however, is sufficiently light, as compared with the conventional skeleton portion since the holes 12, 17 are formed in the skeleton portion 10.

As described above, the holes 12 appear in a cross-section intersecting an extension axis of the first skeleton portion 11. Likewise, the holes 17 appear in a cross-section intersecting an extension axis of the second skeleton portion 16. The holes 12, 17 respectively formed near the outer circumferential surfaces of the first and second skeleton portions 11, 16 are smaller in cross-sectional area than the holes 12, 17 respectively formed at or near the centers (i.e. the extension axis) of the first and second skeleton portions 11. In short, the cross-sectional areas of the holes 12, 17 respectively become larger from the outer circumferential surfaces of the first and second skeleton portions 11, 16 toward the respective centers. It is likely that rigidity of a skeleton member, in which holes having a common cross-sectional area are scattered, goes down. On the other hand, since the cross-sectional areas of the holes 12, 17 according to the present embodiment respectively becomes larger from the outer circumferential surfaces of the first and second skeleton portions 11, 16 toward the respective centers, rigidities of the first and second skeleton portions 11, 16 are retained at a high level.

The holes 12, 17 are formed only in the porous portions 11a, 16a surrounded by the skin layers 11b, 16b. Since the holes 12, 17 are not formed in the skin layers 11b, 16b, an area at a predetermined depth (i.e. a thickness of each of the skin layers 11b, 16b) from the outer circumferential surfaces of the first and second skeleton portions 11, 16 is solid. Therefore, rigidities of the first and second skeleton portions 11, 16 are retained at a high level.

With regard to the present embodiment, the skeleton portion 10 is formed by a three-dimensional laminate molding method. Consequently, the holes 12, 17 respectively extending in the axis directions of the first and second skeleton portions 11, 16 are easily formed in the first and second skeleton portions 11, 16. Therefore, it is easy to form the skeleton portion 10, which is very lightweight as compared with a conventional solid skeleton portion, by a three-dimensional laminate molding method.

Second Embodiment

Figure 6:
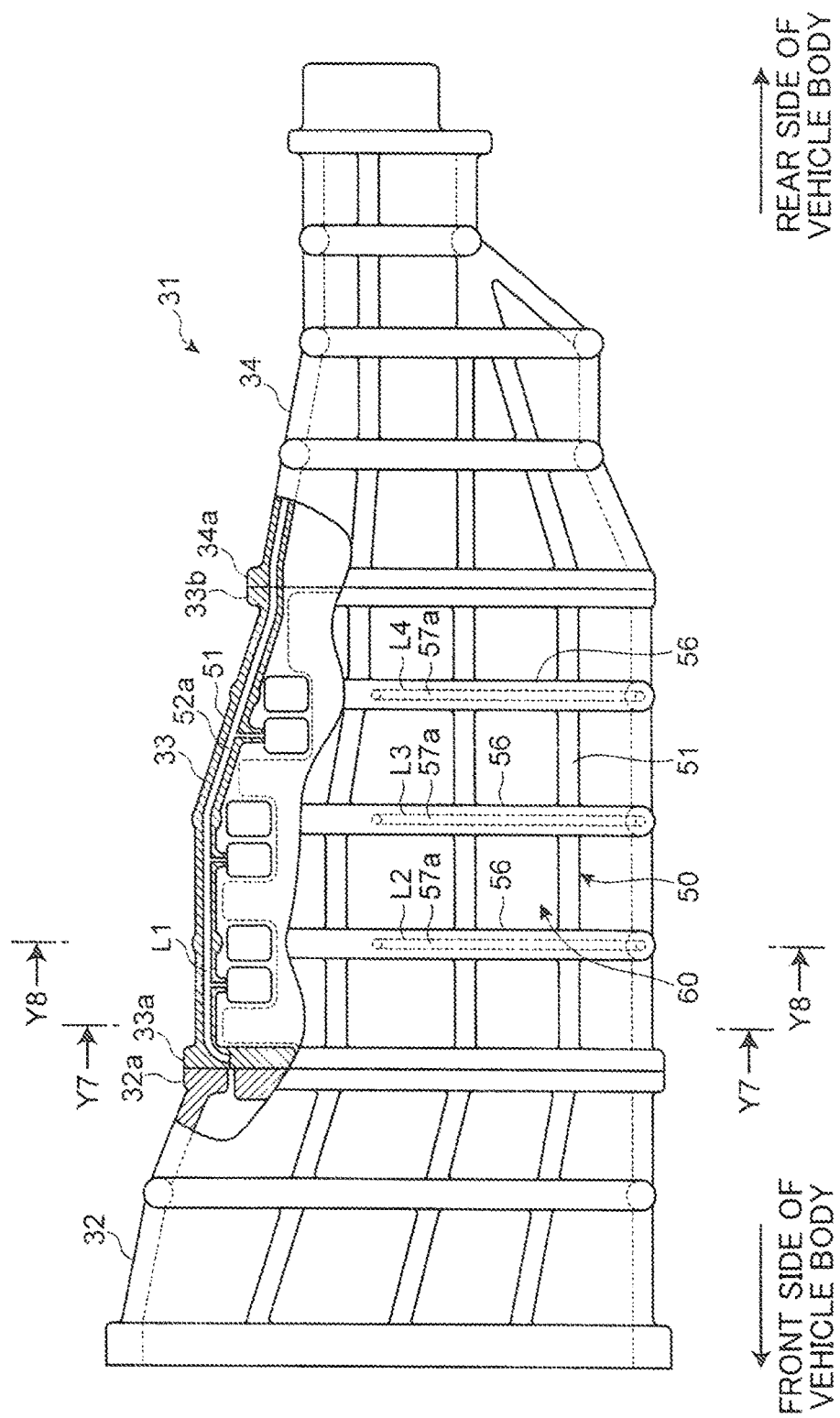
FIG. 6 is a side view of a case for a structure according to the second embodiment.
Figure 7:
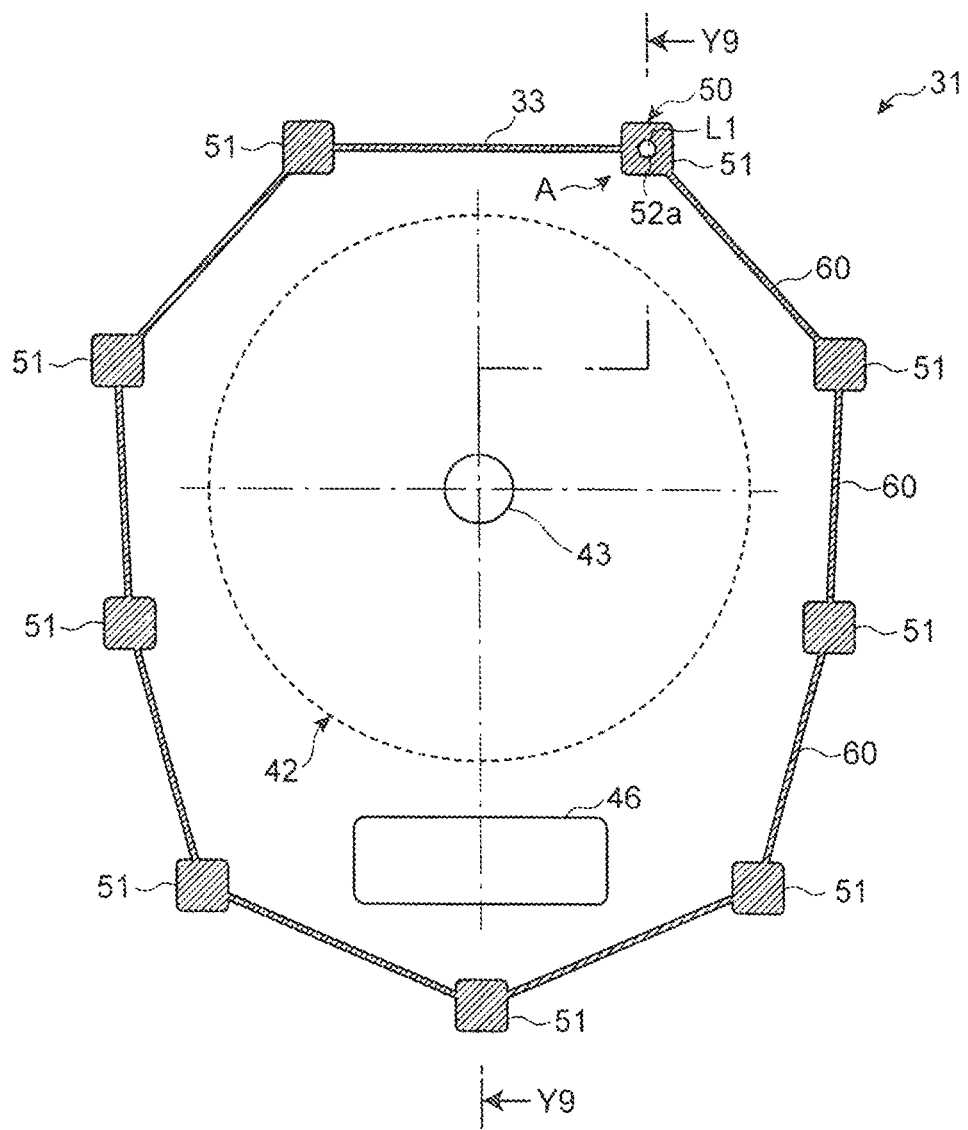
FIG. 7 is a cross-sectional view of the case of the structure taken along the line Y7-Y7 in FIG. 6.
Figure 8:
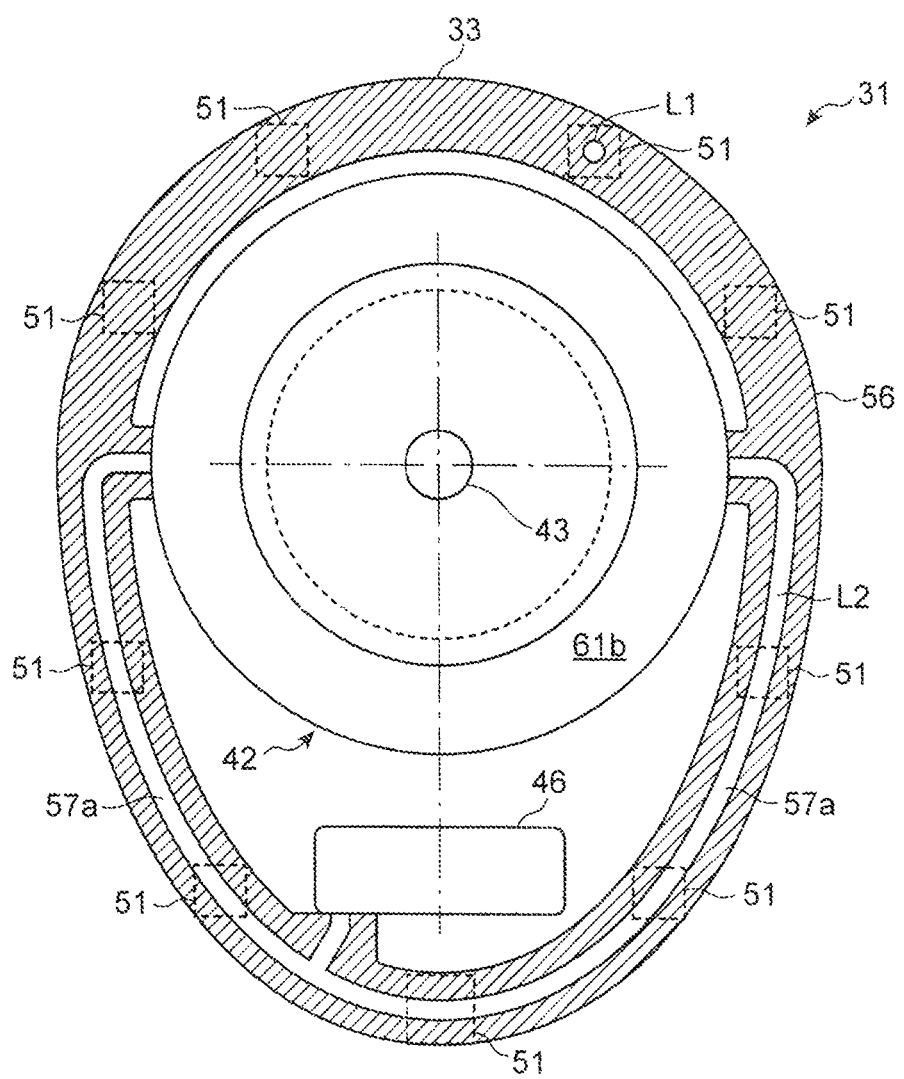
FIG. 8 is a cross-sectional view of the case of the structure taken along the line Y8-Y8 in FIG. 6.
Figure 9:
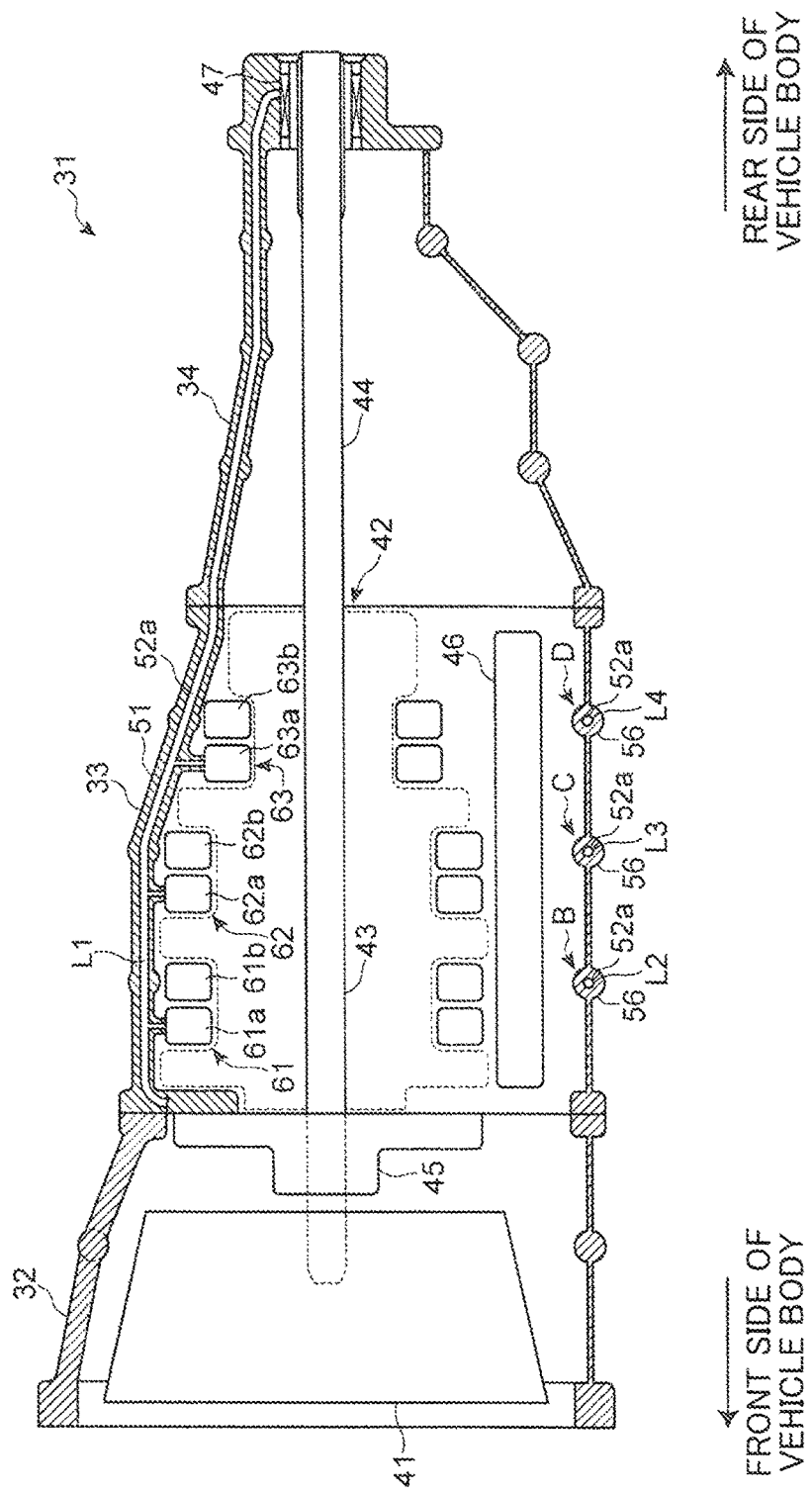
FIG. 9 is a cross-sectional view of the case of the structure taken along the line Y9-Y9 in FIG. 7.

FIG. 6 is a side view of a case of a structure according to the second embodiment. FIG. 7 is a cross-sectional view of the case of the structure taken along the line Y7-Y7 in FIG. 6. FIG. 8 is a cross-sectional view of the case of the structure taken along the line Y8-Y8 in FIG. 6. FIG. 9 is a cross-sectional view of the case of the structure taken along the line Y9-Y9 in FIG. 7. FIGS. 6 to 9 show components situated in the case as well.

Like the case of the structure according to the first embodiment, the case 31 of the structure according to the second embodiment includes a skeleton portion, which forms a skeleton of the case 31, and a wall surface portion, which is a part of the case 31 except for the skeleton portion. The inside of the skeleton portion has a porous structure. In short, holes are formed in the skeleton portion to extend in the axis direction of the skeleton portion. At least one of the holes is used as a fluid flow path for flowing fluid such as oil.

As shown in FIGS. 6 to 9, the case 31 of the structure according to the second embodiment is a case of a transmission which forms a power transmission device to be mounted on a vehicle. The transmission is a longitudinally mounted automatic transmission to be mounted on a front-engine rear drive vehicle. An input shaft of the transmission is substantially coaxial with an output shaft of the transmission. With regard to the present embodiment, the vehicle structure is exemplified by the automatic transmission.

A torque converter 41 and a transmission mechanism 42 are situated in the case 31. The torque converter 41 is connected to a drive source such as an engine placed in front of the case 31. The transmission mechanism 42 is connected to an output portion of the torque converter 41. An axis of the transmission mechanism 42 extends in the front-rear direction of a vehicle body.

The transmission mechanism 42 includes an input shaft 43, an output shaft 44, planetary gear sets (planetary gear mechanisms), and frictional engagement elements such as a clutch and a brake. The input shaft 43 is connected to an output portion of the torque converter 41. The output shaft 44 is coaxial with the input shaft 43. The transmission mechanism 42 selectively engages the frictional engagement elements to switch a power transmission path passing each of the planetary gear sets. Consequently, the transmission mechanism 42 may obtain an appropriate gear position to fit with a driving state of the vehicle.

An oil pump 45 and a valve control unit 46 are further situated in the case 31. The oil pump 45 is placed behind the torque converter 41. The oil pump 45 is driven by a rotation of the drive source to discharge oil. The valve control unit 46 is situated below the transmission mechanism 42. The valve control unit 46 includes a hydraulic control circuit for controlling a pressure of oil to be supplied to the frictional engagement elements and alike. The valve control unit 46 includes a hydraulic control valve for adjusting a discharge pressure of the oil pump 45 into a line pressure which is applied to the frictional engagement elements. The valve control unit 46 further includes a hydraulic control valve for applying an engagement hydraulic pressure to the frictional engagement elements such as a clutch and a brake. With regard to the present embodiment, the mechanical element is exemplified by the torque converter 41, the transmission mechanism 42, the oil pump 45 and the valve control unit 46.

With regard to the present embodiment, engagement oil is supplied from the valve control unit 46 to the frictional engagement elements such as a clutch and a brake. As lubricating oil, oil to be discharged from a hydraulic control valve or alike for adjusting a discharge pressure of the oil pump 45 into a line pressure is supplied to the frictional engagement elements, a bearing portion 47 and alike for cooling frictional heat generated between friction plates of the frictional engagement elements and lubricating the bearing portion 47 of the input and output shafts 43, 44 and alike.

The case 31 includes a converter housing 32, a transmission case 33 and an extension housing 34. The torque converter 41 is stored in the converter housing 32. The transmission mechanism 42 is stored in the transmission case 33. The extension housing 34 is placed behind the transmission case 33. The extension housing 34 is connected to the transmission case 33.

A flange portion 32a forms a rear end of the converter housing 32. A flange portion 33a forms a front end of the transmission case 33. The flange portion 32a is fixed to the flange portion 33a by bolts and nuts.

A flange portion 33b forms a rear end of the transmission case 33. A flange portion 34b forms a front end of the extension housing 34. The flange portion 33b is fixed to the flange portion 34b by bolts and nuts. Accordingly, the case 31 is formed.

Like the case 1, the case 31 includes a skeleton portion 50 and a wall surface portion 60. The skeleton portion 50 forms a skeleton of the case 31. The wall surface portion 60 forms a part of the case 31 except for the skeleton portion 50. The skeleton portion 50 includes first skeleton portions 51 and second skeleton portions 56. The first skeleton portions 51 extend in the front-rear direction of the vehicle body (i.e. in the axis direction of the case 31). The second skeleton portions 56 extend in the circumferential direction of the case 31 in a cross-section orthogonal to the axis direction of the case 31.

As shown in FIG. 7, the first skeleton portions 51 are separate at intervals in the circumferential direction of the case 31 in a cross-section orthogonal to the axis direction of the case 31. FIG. 7 shows the transmission mechanism 42 and the valve control unit 46 situated in the case 31.

Figure 10:
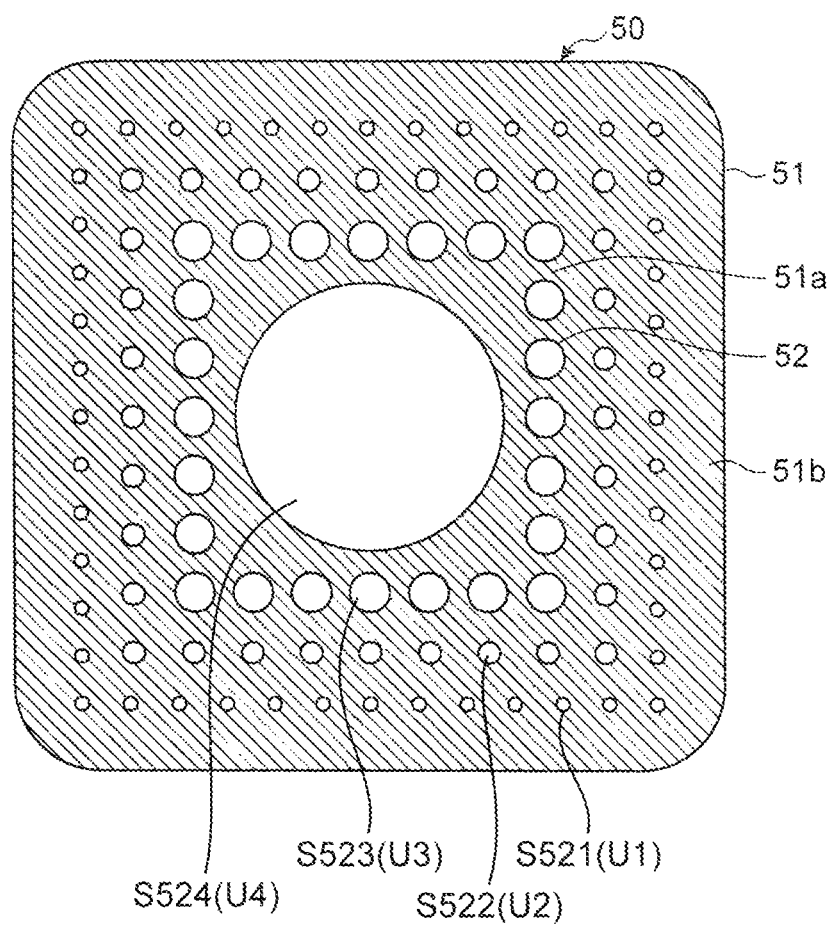
FIG. 10 is a cross-sectional view of a first skeleton portion of the case of the structure shown in FIG. 6.

FIG. 10 is a schematic enlarged cross-sectional view of the first skeleton portion 51 indicated by the arrow A in FIG. 7. The first skeleton portion 51 is described with reference to FIG. 10.

The first skeleton portion 51 extends in the axis direction of the case 31. As shown in FIGS. 7 and 10, the first skeleton portion 51 has a substantially rectangular cross-section. The first skeleton portion 51 has a porous structure. In short, holes 52 are formed in the first skeleton portion 51. The holes 52 extend in the axis direction of the first skeleton portion 51. With regard to the present embodiment, the skeleton member is exemplified by the first skeleton portion 51. The first direction is exemplified by the axis direction of the case 31.

The first skeleton portion 51 includes a porous portion 51a, and a skin layer 51b surrounding the porous portion 51a. The holes 52 are formed in the porous portion 51a whereas the holes 52 are not formed in the skin layer 51b. The skin layer 51b has a predetermined thickness. Therefore, the holes 52 are formed in an inward position from an outer circumferential surface of the first skeleton portion 51 by no less than a predetermined thickness (a thickness of the skin layer 51b). Each of the holes 52 has a substantially circular cross-section. The cross-sectional area of the hole 52 becomes larger inward from the outer circumference of the first skeleton portion 51.

As the holes 52, FIG. 10 shows forty-eight holes 521, thirty-two holes 522, twenty-four holes 523 and one hole 524. The hole 524 has a center substantially coincident with the center of the cross-section of the first skeleton portion 51. The hole 524 is the largest among the holes 52. The forty-eight holes 521 are formed at substantially regular intervals along a square contour hypothetically depicted in the cross-section of the first skeleton portion 51. The center of a square hypothetically depicted by the forty-eight holes 521 is substantially coincident with the center of the hole 524. Each of the forty-eight holes 521 is the smallest in cross-sectional area among the holes 52. The thirty-two holes 522 are formed at substantially regular intervals along a square contour hypothetically depicted in the cross-section of the first skeleton portion 51. The square hypothetically depicted by the thirty-two holes 522 is smaller than the square hypothetically depicted by the forty-eight holes 521. The center of the square hypothetically depicted by the thirty-two holes 522 is substantially coincident with the center of the hole 525. Each of the thirty-two holes 522 is larger in cross-sectional area than each of the forty-eight holes 521 and smaller in cross-sectional area than the hole 524. The twenty-four holes 523 are formed at substantially regular intervals along a square contour hypothetically depicted in the cross-section of the first skeleton portion 51. The square hypothetically depicted by the twenty-four holes 523 is smaller than the square hypothetically depicted by the thirty-two holes 522. The center of the square hypothetically depicted by the twenty-four holes 523 is substantially coincident with the center of the hole 524. Each of the twenty-four holes 523 is larger in cross-sectional area than each of the thirty-two holes 522 and smaller in cross-sectional area than the hole 524.

The symbol "U1" shown in FIG. 10 means a cross-sectional area of each of the forty-eight holes 521. The symbol "U2" shown in FIG. 10 means a cross-sectional area of each of the thirty-two holes 522. The symbol "U3" shown in FIG. 10 means a cross-sectional area of each of the twenty-four holes 523. The symbol "U4" shown in FIG. 10 means a cross-sectional area of the hole 524. The relationship expressed by the inequality shown in FIG. 10 is established among these cross-sectional areas.

With regard to the present embodiment, the hole 524 formed in the central portion of the first skeleton portion 51 is the largest in cross-sectional area among the holes 52 formed in the first skeleton portion 51. The hole 524 formed in the first skeleton portion 51 indicated by the arrow A in FIG. 7 is used as a fluid flow path L1 for supplying oil to the transmission mechanism 42. The fluid flow path L1 extends in the axis direction of the case 31 above a first brake 61, a second brake 62 and a third brake 63. With regard to the present embodiment, the flow path may be exemplified by the fluid flow path L1. The frictional engagement elements may be exemplified by the first to third brakes 61, 62, 63.

As shown in FIG. 9, the first to third brakes 61, 62, 63 are situated in the case 31 so that the first to third brakes 61, 62, 63 are arranged at intervals in the axis direction of the case 31. The first to third brakes 61, 62, 63 lock the transmission mechanism 42. The first brake 61 is situated in front of the second and third brakes 62, 63. The third brake 63 is situated behind the first and second brakes 61, 62. The first to third brakes 61, 62, 63 respectively include friction plate sets 61a, 62a, 63a, and hydraulic chambers 61b, 62b, 63b. Each of the friction plate sets 61a, 62a, 63a has a fixing-side friction plate and a rotating-side friction plate. The fixing-side friction plate is engaged with the case 31 by spline. The rotating-side friction plate is engaged with a predetermined rotating member by spline. The fixing-side friction plate and the rotating-side friction plate are alternately arranged. Engagement oil for moving a piston to engage the fixing-side friction plate with the rotating-side friction plate is supplied to the hydraulic chambers 61b, 62b, and 63b.

The first to third brakes 61, 62, 63 respectively move the piston toward the friction plate sets 61a, 62a, 63a when engagement oil is supplied to the hydraulic chambers 61b, 62b, 63b. Consequently, the fixing-side friction plate is engaged with the rotating-side friction plate so that the predetermined rotating member is fixed.

The hole 524 forming the fluid flow path L1 is opened in an inner circumferential surface of the case 31. The hole 524 is communicated with the valve control unit 46. The hole 524 extends from a front end of the transmission case 33 to a rear end of the extension housing 34. The hole 524 is connected to each of the friction plate sets 61a, 62a, 63a of the first to third brakes 61, 62, 63. In addition, the hole 524 is connected to the bearing portion 47 situated at a rear end of the extension housing 34.

Oil from the valve control unit 46 is supplied to the friction plate sets 61a, 62a, 63a, the bearing portion 47 and alike through the hole 524 which extends in the first skeleton portion 51 to form the fluid flow path L1 elongated in the case 31.

Like the first skeleton portion 51 shown in FIG. 10, holes 52 extending in the axis direction of the first skeleton portion 51 are formed in the first skeleton portion 51 other than the first skeleton portion 51 indicated by the arrow A in FIG. 7. The hole 524 formed in the central portion of the other first skeleton portion 51 may be used as a fluid flow path for flowing oil.

Figure 11:
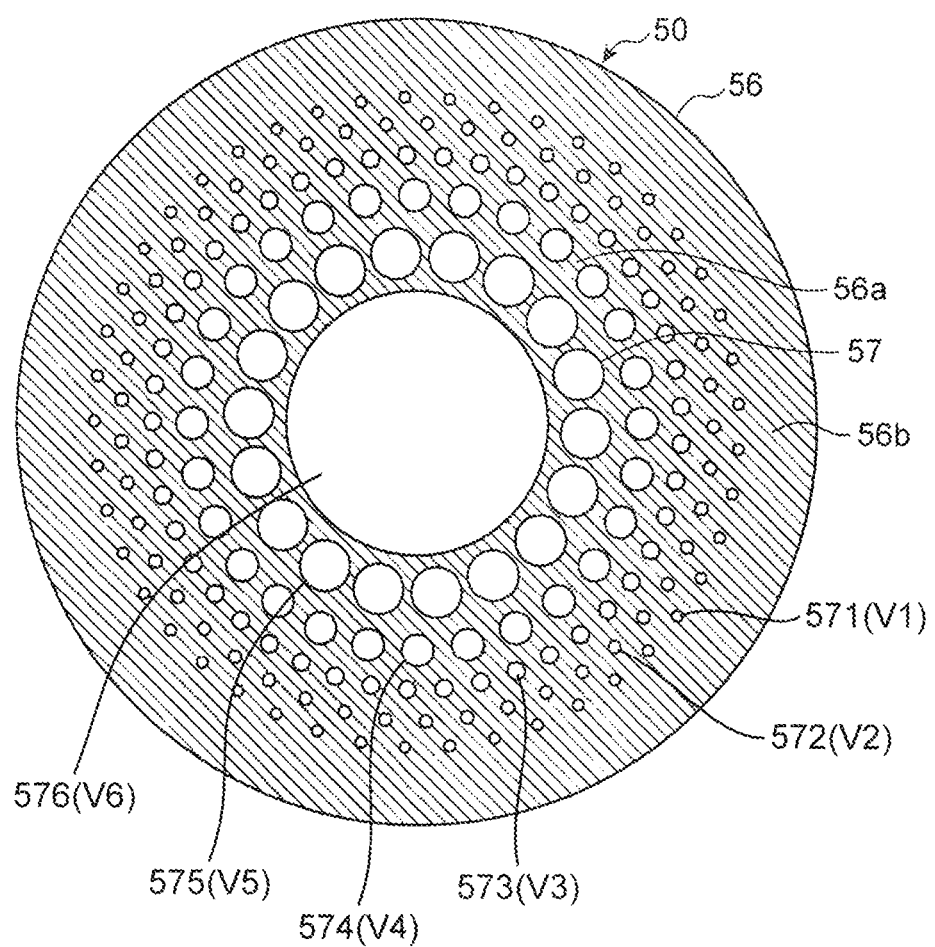
FIG. 11 is a cross-sectional view of a second skeleton portion of the case of the structure shown in FIG. 6.

FIG. 11 is a schematic enlarged cross-sectional view of the second skeleton portion 56 indicated by the arrow B in FIG. 9. The second skeleton portion 56 is described with reference to FIG. 11.

The second skeleton portion 56 extends in the circumferential direction of the case 31 to intersect the first skeleton portions 51. As shown in FIG. 11, the second skeleton portion 56 has a substantially circular cross-section. Like the first skeleton portion 51, the second skeleton portion 56 also has a porous structure. In short, holes 57 are formed in the second skeleton portion 56. The holes 57 extend in the axis direction of the second skeleton portion 56. With regard to the present embodiment, the second direction is exemplified by the circumferential direction of the case 31.

The second skeleton portion 56 includes a porous portion 56a, and a skin layer 56b surrounding the porous portion 56a. The holes 57 are formed in the porous portion 56a whereas the holes 57 are not formed in the skin layer 56b. The skin layer 56b has a predetermined thickness. Therefore, the holes 57 are formed inward from an outer circumferential surface of the second skeleton portion 56 by no less than a predetermined thickness (i.e. a thickness of the skin layer 56b). Each of the holes 57 has a substantially circular cross-section. The cross-sectional area of the hole 57 becomes larger inward from an outer circumference of the second skeleton portion 56. With regard to the present embodiment, the second porous portion is exemplified by the porous portion 56a. The second skin layer is exemplified by the skin layer 56b. The second holes are exemplified by the holes 57.

As the holes 57, FIG. 11 shows forty-five holes 571, forty-five holes 572, forty-five holes 573, twenty-eight holes 574, eighteen holes 575 and one hole 576. The hole 576 has a center substantially coincident with the center of the cross-section of the second skeleton portion 56. The hole 576 is the largest among the holes 57. The forty-five holes 571 are formed at substantially regular intervals along a circular contour hypothetically depicted in the cross-section of the second skeleton portion 56. The center of a circle hypothetically depicted by the forty-five holes 571 is substantially coincident with the center of the hole 576. Each of the forty-five holes 571 is the smallest in cross-sectional area among the holes 57. The forty-five holes 572 are formed at substantially regular intervals along a circular contour hypothetically depicted in the cross-section of the second skeleton portion 56. The circle hypothetically depicted by the forty-five holes 572 is smaller than the circle hypothetically depicted by the forty-five holes 571. The center of the circle hypothetically depicted by the forty-five holes 572 is substantially coincident with the center of the hole 577. Each of the forty-five holes 572 is larger in cross-sectional area than each of the forty-five holes 521 and smaller in cross-sectional area than the hole 576. The forty-five holes 573 are formed at substantially regular intervals along a circular contour hypothetically depicted in the cross-section of the second skeleton portion 56. The circle hypothetically depicted by the forty-five holes 573 is smaller than the circle hypothetically depicted by the forty-five holes 572. The center of the circle hypothetically depicted by the forty-five holes 573 is substantially coincident with the center of the hole 576. Each of the forty-five holes 573 is larger in cross-sectional area than each of the forty-five holes 572 and smaller in cross-sectional area than the hole 576. The twenty-eight holes 574 are formed at substantially regular intervals along a circular contour hypothetically depicted in the cross-section of the second skeleton portion 56. The circle hypothetically depicted by the twenty-eight holes 574 is smaller than the circle hypothetically depicted by the forty-five holes 573. The center of the circle hypothetically depicted by the twenty-eight holes 574 is substantially coincident with the center of the hole 576. Each of the twenty-eight holes 574 is larger in cross-sectional area than each of the forty-five holes 573 and smaller in cross-sectional area than the hole 576. The eighteen holes 575 are formed at substantially regular intervals along a circular contour hypothetically depicted in the cross-section of the second skeleton portion 56. The circle hypothetically depicted by the eighteen holes 575 is smaller than the circle hypothetically depicted by the twenty-eight holes 574. The center of the circle hypothetically depicted by the eighteen holes 575 is substantially coincident with the center of the hole 576. Each of the eighteen holes 575 is larger in cross-sectional area than each of the twenty-eight holes 574 and smaller in cross-sectional area than the hole 576.

The symbol "V1" shown in FIG. 11 means a cross-sectional area of each of the forty-five holes 571. The symbol "V2" shown in FIG. 11 means a cross-sectional area of each of the forty-five holes 572. The symbol "V3" shown in FIG. 11 means a cross-sectional area of each of the forty-five holes 573. The symbol "V4" shown in FIG. 11 means a cross-sectional area of each of the twenty-eight holes 574. The symbol "V5" shown in FIG. 11 means a cross-sectional area of each of the eighteen holes 575. The symbol "V6" shown in FIG. 11 means a cross-sectional area of the hole 576. The relationship expressed by the inequality shown in FIG. 11 is established among these cross-sectional areas.

With regard to the present embodiment, the hole 576 formed in the center of the second skeleton portion 56 is the largest among the holes 57 formed in the second skeleton portion 56. The hole 576 formed in the second skeleton portion 56 indicated by the arrow B in FIG. 9 is used as a fluid flow path L2 for supplying oil to the transmission mechanism 42. With regard to the present embodiment, another flow path may be exemplified by the fluid flow path L2.

As shown in FIG. 8, the hole 576 forming the fluid flow path L2 is opened in an inner circumferential surface of the case 31. The hole 576 is communicated with the valve control unit 46 situated at a bottom portion of the case 31. The hole 576 extends upward from the valve control unit 46 along the transmission case 33. The hole 576 is connected to the hydraulic chamber 61b of the first brake 61 in a middle portion of the transmission case 33 in the vertical direction (i.e. a height position between the valve control unit 46 and the first skeleton portion 51 where the fluid flow path L1 is formed).

Oil from the valve control unit 46 is supplied to the hydraulic chamber 61b of the first brake 61 through a hole 57a of the second skeleton portion 56 forming the fluid flow path L2 in the case 31.

Like the second skeleton portion 56 indicated by the arrow B in FIG. 9, holes 57 in the second skeleton portions 56 indicated by the arrows C, D in FIG. 9 extend in the axis direction of the second skeleton portions 56. The hole 576 formed in the center of each of the second skeleton portions 56 indicated by the arrows C, D in FIG. 9 is larger in cross-sectional area than the other holes 57. The holes 576 formed at the centers of the second skeleton portions 56 indicated by the arrows C, D in FIG. 9 are respectively used as fluid flow paths L3, L4 for flowing oil.

Like the hole 57a forming the fluid flow path L2, the holes 576 forming the fluid flow paths L3, L4 are respectively opened in an inner circumferential surface of the case 31. The holes 576 forming the fluid flow paths L3, L4 are respectively communicated with the valve control unit 46. The holes 576 forming the fluid flow paths L3, L4 respectively extend upward along the transmission case 33. The holes 576 forming the fluid flow paths L3, L4 are respectively communicated with the hydraulic chambers 62b, 63b of the second and third brakes 62, 63 in the middle portion of the transmission case 33 in the vertical direction.

Oil from the valve control unit 46 is supplied to the hydraulic chambers 62b, 63b of the second and third brakes 62, 63 through the holes 57a of the second skeleton portions 56 which form the fluid flow paths L3, L4, respectively.

Like the second skeleton portion 56 shown in FIG. 11, the holes 57 are also formed in second skeleton portions 56 other than the second skeleton portions 56 indicated by the arrows B, C, D in FIG. 9. The hole 576 formed at the center of one of the other second skeleton portions 56 may be used as a fluid flow path for flowing oil.

The wall surface portion 60 of the case 31 is arranged so as to cover an opening portion of the skeleton portion 50 (i.e. the opening portion surrounded by the first and second skeleton portions 51, 56). As shown in FIG. 7, the wall surface portion 60 is a flat plate thinner than the skeleton portion 50.

Like the case 1 of the structure according to the first embodiment, the case 31 of the structure according to the second embodiment is formed by using a 3D printer (i.e. a three-dimensional laminate molding method). The holes 52, 57 are formed in the skeleton portion 50 forming a skeleton of the case 31 by a three-dimensional laminate molding method. The skeleton portion 50 of the case 31 may be integrally formed with the wall surface portion 60 of the case 31 by a three-dimensional laminate molding method.

With regard to the present embodiment, one hole 526 of the holes 52 formed in the skeleton portion 50 and one hole 576 of the holes 57 formed in the skeleton portion 50 are used as fluid flow paths for flowing oil. Alternatively, a plurality of holes may be used as fluid flow paths. At least one hole 526 of the holes 52 formed in the skeleton portion 50 and at least one hole 576 of the holes 57 formed in the skeleton portion 50 may be used as fluid flow paths for flowing oil. At least one hole 526 of the holes 52 formed in the skeleton portion 50 and at least one hole 576 of the holes 57 formed in the skeleton portion 50 may be used as fluid flow paths for flowing fluid such as cooling water.

With regard to the present embodiment, the case 31 of the structure includes the skeleton portion 50 and the wall surface portion 60. The holes 52, 57 extending in the axis direction of the skeleton portion 50 are formed in the skeleton portion 50. Since a conventional skeleton portion is completely solid, the conventional skeleton portion is very heavy. The skeleton portion 50 according to the present embodiment is sufficiently lightweight as compared with the conventional skeleton portion since the holes 52, 57 are formed in the skeleton portion 50.

At least one hole 526 of the holes 52 and at least one hole 576 of the holes 57 are used as the fluid flow paths L1, L2, L3, L4 for flowing fluid. Therefore, the holes 526, 576 are advantageously used for flowing fluid such as oil or cooling water to be supplied to the frictional engagement elements 61, 62, 63, the bearing portion 47 and alike, which are situated in the case 31 of the structure.

Various improvements and design modifications are applicable to the principles of the aforementioned embodiments as far as such improvements and design modifications do not depart from a scope of the present invention. The aforementioned description and drawings should not be construed restrictively.

With regard to the aforementioned embodiments, holes are formed in each of skeleton members (i.e. first skeleton portions and second skeleton portions) for use in forming a case. Alternatively, some of skeleton members for use in forming a case may have a solid structure (i.e. a structure without holes). Even in this case, since holes are formed in other skeleton members, the case becomes lightweight. A skeleton member having a solid structure may be preferentially formed in a portion of the case where rigidity is required. In this case, the case may become very rigid. Alternatively, a designer may give a large value to an installation interval of skeleton members in the case.

With regard to the aforementioned embodiments, a formation pattern of holes coincides with a cross-sectional shape of a skeleton member. In short, holes form a rectangular pattern in a cross-section of a skeleton member when the cross-section is rectangular. Holes form a circular pattern in a cross-section of a skeleton member when the cross-section is circular. Alternatively, a formation pattern of holes may not coincide with a cross-sectional shape of a skeleton member. When a cross-section of a skeleton member is rectangular, holes may form a circular pattern in the cross-section. When a cross-section of a skeleton member is circular, holes may form a rectangular pattern in the cross-section.

With regard to the aforementioned embodiments, a skeleton member has a rectangular or circular cross-section. Alternatively, a cross-section of a skeleton member may have another shape. A designer may determine a cross-sectional shape of a skeleton member so as to obtain rigidity required for the case. Therefore, a cross-section of a skeleton member may be triangular, hexagonal or another shape. The principles of the aforementioned embodiments are not limited to a specific shape of a cross-section of a skeleton member.

The exemplificative case described in the context of the aforementioned embodiments mainly includes the following features.

A case according to one aspect of the aforementioned embodiments is used as a case of a vehicle structure, in which a mechanical element is stored. The case includes: a wall surface portion which forms an outer surface of the case; and a skeleton portion which bulges inward and outward of the case from the wall surface portion, the skeleton portion being integrally formed with the wall surface portion. The skeleton portion includes at least one skeleton member having a first porous portion in which first holes are formed to extend in a first direction, and a first skin layer without the first holes, the first skin layer surrounding the first porous portion. A cross-sectional area of the first holes is set in a cross-section intersecting the first direction to become larger from an outer circumferential surface of the at least one skeleton member toward a center of the at least one skeleton member.

According to the aforementioned configuration, since the skeleton portion bulges inward and outward of the case from the wall surface portion and is integrally formed with the wall surface portion, the case may have a thick skeleton portion, which results in a rigid structure. Since the first holes are formed to extend in the first direction in the at least one skeleton member of the skeleton portion, the case becomes lightweight. Since the cross-sectional area of the first holes becomes larger in a cross-section intersecting the first direction from the outer circumferential surface of the at least one skeleton member toward the center of the at last one skeleton member and the first porous portion is surrounded by the first skin layer without the first holes are formed, the at least one skeleton member may become sufficiently rigid. Accordingly, the case may also become sufficiently rigid.

With regard to the aforementioned configuration, at least one of the first holes may form a flow path of fluid to be supplied to the mechanical element.

According to the aforementioned configuration, since the at least one of the first holes forms the flow path of fluid to be supplied to the mechanical element, a designer does not have to prepare a pipe member for supplying fluid to the mechanical member. Accordingly, the designer may make the vehicle structure lightweight.

With regard to the aforementioned configuration, the vehicle structure may be an automatic transmission. The mechanical element may include an oil pump which discharges oil as the fluid, and frictional engagement elements arranged at intervals in the first direction. The at least one skeleton member may be a first skeleton portion extending in the first direction. The oil may be supplied from the oil pump to the frictional engagement elements through the flow path to drive the frictional engagement elements.

According to the aforementioned configuration, since oil is supplied from the oil pump to the frictional engagement elements through the valve control unit and the first skeleton portion to drive the frictional engagement elements, a designer does not have to prepare a pipe member for supplying fluid to the mechanical element. Accordingly, the designer may also make the vehicle structure lightweight.

With regard to the aforementioned configuration, the mechanical element may include a valve control unit which adjusts a discharge pressure of the oil. The skeleton portion may include a second skeleton portion extending in a second direction so as to intersect the first skeleton portion. The second skeleton portion may include a second porous portion, in which second holes are formed to extend in the second direction, and a second skin layer without the second holes, the second skin layer surrounding the second porous portion. At least one of the second holes may form another flow path for flowing oil to be supplied from the oil pump to the frictional engagement elements through the valve control unit and the flow path.

According to the aforementioned configuration, since the second skeleton portion includes the second porous portion in which the second holes are formed to extend in the second direction, the second skeleton portion is not too heavy. Since the second porous portion is surrounded by the second skin layer without the second holes, the second skeleton portion may also become sufficiently rigid, like the first skeleton portion. Since the at least one of the second holes forms another flow path for flowing oil to be supplied from the oil pump to the frictional engagement elements through the valve control unit and the flow path, a designer does not have to prepare a pipe member for supplying fluid to the mechanical element. Accordingly, the designer may also make the vehicle structure lightweight.

With regard to the aforementioned configuration, the mechanical element may include a valve control unit which adjusts a discharge pressure of the oil. The skeleton portion may include second skeleton portions extending in a second direction so as to intersect the first skeleton portion. Each of the second skeleton portions may include a second porous portion in which second holes are formed to extend in the second direction, and a second skin layer without the second holes, the second skin layer surrounding the second porous portion. The frictional engagement elements may be arranged in correspondence to the second skeleton portions. At least one of the second holes of each of the second skeleton portions may form another flow path for flowing oil to be supplied from the oil pump to a corresponding frictional engagement element through the valve control unit and the flow path.

According to the aforementioned configuration, since each of the second skeleton portions has the second porous portion in which the second holes are formed to extend in the second direction, each of the second skeleton portions is not too heavy. Since the second porous portion is surrounded by the second skin layer without the second holes, each of the second skeleton portions may become sufficiently rigid, like the first skeleton portion. Since the at least one of the second holes of each of the second skeleton portions forms another flow path for flowing oil to be supplied from the oil pump to a corresponding frictional engagement element through the valve control unit and the flow path, a designer does not have to prepare a pipe member for supplying fluid to the mechanical element. Accordingly, the designer may also make the vehicle structure lightweight.

With regard to the aforementioned configuration, the flow path formed by the first skeleton portion may extend in the first direction above the frictional engagement elements. The flow path formed by each of the second skeleton portions may extend upward from the valve control unit situated at a bottom portion of the case and be connected to the corresponding frictional engagement element at a height position between the flow path extending in the first direction and the valve control unit.

According to the aforementioned configuration, since the flow path formed by the first skeleton portion extends in the first direction above the frictional engagement elements whereas the flow path formed by each of the second skeleton portions extends upward from the valve control unit situated at the bottom portion of the case and is connected to the corresponding frictional engagement element at the height position between the flow path extending in the first direction and the valve control unit, the flow path formed by the first skeleton portion is not connected to the flow path formed by each of the second skeleton portions. Accordingly, oil flowing through the flow path formed by the first skeleton portion is not influential to the flow path formed by each of the second skeleton portions. Accordingly, control for oil supply to the frictional engagement elements is simplified.

INDUSTRIAL APPLICABILITY

The principles of the aforementioned embodiments are advantageously used in the industrial field of manufacturing vehicles.

The invention claimed is:

1. A case of an automatic transmission in which a mechanical element including an oil pump configured to discharge oil, frictional engagement elements arranged at intervals in a first direction and a valve control unit configured to adjust a discharge pressure of the oil is stored, the case comprising:
a wall surface portion which forms an outer surface of the case; and
a skeleton portion which bulges inward and outward of the case from the wall surface portion, the skeleton portion being integrally formed with the wall surface portion,
wherein the skeleton portion includes a first skeleton portion extending in the first direction and a second skeleton portion extending in a second direction so that the second skeleton portion intersects the first skeleton portion, the first skeleton portion having a first porous portion in which first holes are formed to extend in the first direction, and a first skin layer without the first holes, the first skin layer surrounding the first porous portion,
wherein a cross-sectional area of each of the first holes is set in a cross-section intersecting the first direction so as to become larger from an outer circumferential surface of the first skeleton portion toward a center of the first skeleton portion,
wherein at least one of the first holes forms a flow path through which the oil is supplied from the oil pump to the frictional engagement elements to drive the frictional engagement elements,
wherein the second skeleton portion includes a second porous portion in which second holes are formed to extend in the second direction, and a second skin layer without the second holes, the second skin layer surrounding the second porous portion, and
wherein at least one of the second holes forms another flow path for flowing the oil to be supplied from the oil pump to the frictional engagement elements through the valve control unit and the flow path.

2. A case of an automatic transmission in which a mechanical element including an oil pump configured to discharge oil, frictional engagement elements arranged at intervals in a first direction and a valve control unit configured to adjust a discharge pressure of the oil is stored, the case comprising:
a wall surface portion which forms an outer surface of the case; and
a skeleton portion which bulges inward and outward of the case from the wall surface portion, the skeleton portion being integrally formed with the wall surface portion,
wherein the skeleton portion includes a first skeleton portion extending in the first direction and second skeleton portions extending in a second direction so that the second skeleton portions intersects the first skeleton portion, the first skeleton portion having a first porous portion in which first holes are formed to extend in the first direction, and a first skin layer without the first holes, the first skin layer surrounding the first porous portion, and
wherein a cross-sectional area of each of the first holes is set in a cross-section intersecting the first direction so as to become larger from an outer circumferential surface of the first skeleton portion toward a center of the first skeleton portion,
wherein at least one of the first holes forms a flow path through which the oil is supplied from the oil pump to the frictional engagement elements to drive the frictional engagement elements,
wherein each of the second skeleton portions includes a second porous portion in which second holes are formed to extend in the second direction, and a second skin layer without the second holes, the second skin layer surrounding the second porous portion,
wherein the frictional engagement elements are arranged in correspondence to the second skeleton portions, and
wherein at least one of the second holes of each of the second skeleton portions forms another flow path for flowing the oil to be supplied from the oil pump to a corresponding frictional engagement element through the valve control unit and the flow path.

3. The case according to claim 2,
wherein the flow path formed by the first skeleton portion extends in the first direction above the frictional engagement elements, and
wherein the flow path formed by each of the second skeleton portions extends upward from the valve control unit situated at a bottom portion of the case, the flow path formed by each of the second skeleton portions being connected to the corresponding frictional engagement element at a height position between the flow path extending in the first direction and the valve control unit.

* * * * *